United States Patent [19]

Morota et al.

[11] Patent Number: 5,234,228
[45] Date of Patent: Aug. 10, 1993

[54] AIR BAG APPARATUS

[75] Inventors: Makie Morota, Utsunomiya; Katuhiko Sasakawa, Minamikawachimachi, both of Japan

[73] Assignee: Honda Giken Kogyo Kabushiki Kaisha, Tokyo, Japan

[21] Appl. No.: 817,010

[22] Filed: Jan. 3, 1992

[30] Foreign Application Priority Data

Feb. 12, 1991 [JP] Japan .................................. 3-018881

[51] Int. Cl.$^5$ ............................................. B60R 21/32
[52] U.S. Cl. .................................... 280/734; 280/735; 180/273
[58] Field of Search .................. 280/734, 735, 806; 180/282, 268, 273

[56] References Cited

U.S. PATENT DOCUMENTS

| | | | |
|---|---|---|---|
| 3,672,699 | 6/1972 | De Windt | 290/150 AB |
| 4,995,639 | 2/1991 | Breed | 280/735 |
| 5,040,115 | 8/1991 | Fukushima et al. | 364/426.01 |
| 5,129,673 | 7/1992 | Mattes et al. | 280/735 |
| 5,161,820 | 11/1992 | Vollmer | 280/735 |
| 5,172,790 | 12/1992 | Ishikawa et al. | 180/268 |

FOREIGN PATENT DOCUMENTS 0458102  11/1991  European Pat. Off. ............ 280/734

*Primary Examiner*—Margaret A. Focarino
*Assistant Examiner*—Paul Dickson
*Attorney, Agent, or Firm*—Armstrong, Westerman, Hattori, McLeland & Naughton

[57] ABSTRACT

An air bag for a vehicle is contained, respectively, in a steering wheel which is disposed in front of a driver's seat and in a dashboard which is disposed in front of a passenger's seat. When a seat switch has detected that there is no passenger seated in the passenger's seat, the inflation of the air bag for the passenger's seat is prohibited. Two impact sensors for detecting the longitudinal and lateral impact forces are provided. When that direction $\theta$ of the impact force which is obtained by the two sensors deviates towards the passenger's seat beyond a predetermined angle, the prohibition of inflation of the air bag for the passenger's seat is cancelled. When the vehicle is collided at a portion which is deviated towards the passenger's seat, the air bag for the passenger's seat is also inflated to alleviate the movement of the driver towards the passenger's seat. Instead of detecting the direction of the impact force by the two impact sensors, a switch-type acceleration sensor which is switched on when the impact force towards the passenger's seat is above a predetermined value may also be used so that the air bag for the passenger's seat can be inflated.

3 Claims, 2 Drawing Sheets

5,234,228

AIR BAG APPARATUS

BACKGROUND OF THE INVENTION

Field of the Invention

This invention relates to an air bag apparatus for a vehicle such as a motor vehicle, in which air bags disposed in front of a driver's seat and an assistant driver's seat are inflated at the time of collision of the vehicle.

Description of the Related Art

As an apparatus for protecting passengers, there is conventionally known an air bag apparatus for a vehicle wherein an air bag is contained in a steering wheel in front of a driver's seat and in a dashboard in front of a passenger's seat, respectively; there is also disposed in an appropriate position of the vehicle an acceleration sensor which is operated when an impact force greater than a predetermined value is exerted; and when the acceleration sensor is operated, an inflating means is provided in each air bag which is operated to instantly inflate each air bag, thereby alleviating the impact force to act on the passengers by means of the air bags. In addition, among apparatuses in which air bags for the driver's seat and for the passenger's seat are parallelly provided, a Japanese utility model registration application whose application No. is 116190/Heisei 2 (1990) has also been filed by the same applicants for an apparatus which is characterized in that there is provided a passenger sensor for detecting the presence or absence of a passenger in the passenger's seat and that the operation of the air bag for the passenger's seat is prohibited when there is no passenger seated in the passenger's seat.

The impact force which acts on the passengers at the time of collision of the vehicle normally comes from the front side. It is therefore possible to effectively alleviate the impact force to act on the driver by the inflation of the air bag in front of the driver's seat. However, when the vehicle collides at a portion other than the front portion, there are cases where lateral forces are exerted on the driver. In such a case, if the driver is exposed to an impact force directing him towards the passenger's seat, there is no particular problem because there is no object for him to hit on the side of the passenger's seat. It is, however, preferable that, in order to further increase the feeling of assurance of the driver, a shock absorbing function is obtained resisting his movement towards the passenger's seat by some means.

SUMMARY OF THE INVENTION

It is therefore an object of this invention, noting the air bag for the passenger's seat, to provide an air bag apparatus in which the driver's movement towards the passenger's seat is alleviated by the use of the above-described air bag, thereby further increasing the feeling of assurance of the driver.

In order to achieve the above-described object, this invention provides an air bag apparatus for a vehicle having an air bag for a driver's seat and for a passenger's seat, respectively, the air bag being disposed in front of the driver's seat and the passenger's seat, respectively, and being inflatable at the time of collision of the vehicle, and prohibiting means for prohibiting the inflation of the air bag for the passenger's seat when there is no passenger in the passenger's seat, the air bag apparatus comprising prohibition cancelling means which, upon detection of the direction of an impact force to act on a driver, cancels the operation of the prohibiting means when the direction of the impact force deviates from the front of the vehicle towards the passenger's seat beyond a predetermined angle.

Even in case where no passenger is seated in the passenger's seat and the inflation of the air bag for the passenger's seat is prohibited, the direction of the impact force to act on the driver at the time of collision of the vehicle is detected, and the air bag for the passenger's seat is caused to inflate to alleviate the driver's movement towards the passenger's seat provided the direction of the impact force deviates towards the passenger's seat beyond a predetermined angle.

The driver's movement towards the passenger's seat may also be alleviated by inflating the air bag for the passenger's seat through the operation of an acceleration sensor which is operated when the impact force to act on the driver in the direction towards the passenger's seat exceeds a predetermined value.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF A PREFERRED EMBODIMENT

Figure 1:
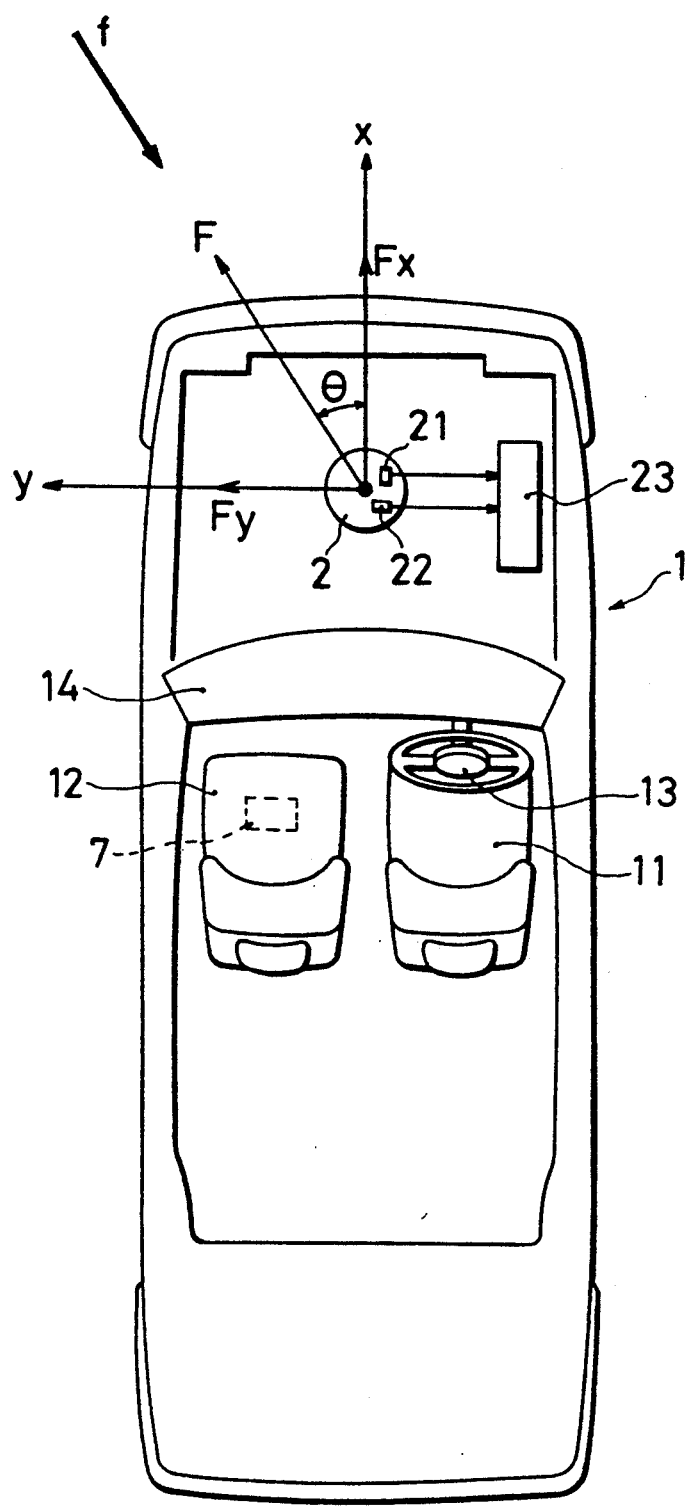
FIG. 1 is a plan view of a vehicle to which this invention apparatus is applied.
Figure 2:
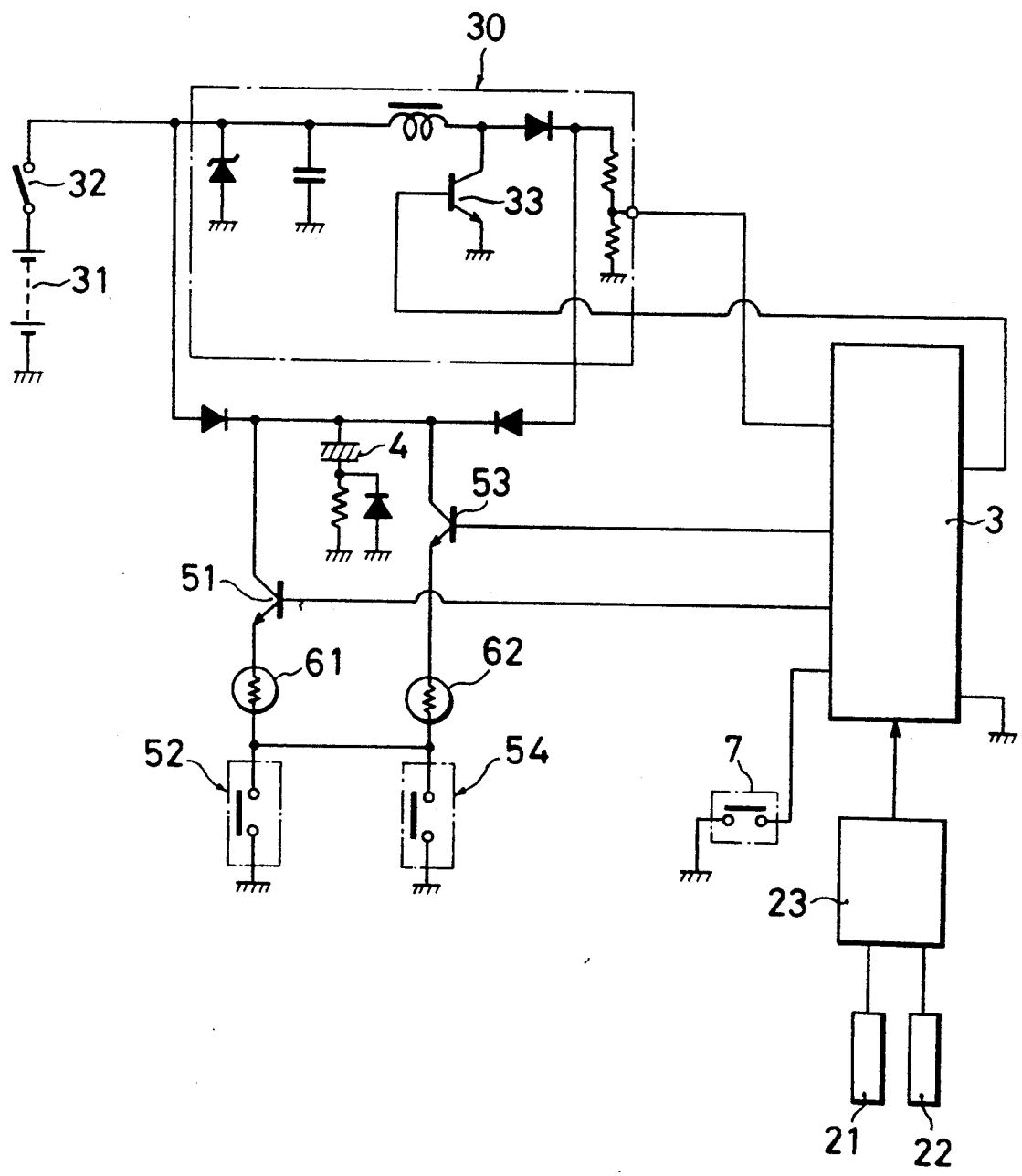
FIG. 2 is a diagram showing the circuit constitution of an embodiment of this invention.

In the vehicle 1, such as a motor vehicle, there are provided a driver's seat 11 for seating a driver and an passenger's seat 12 for seating another passenger. An air bag is contained, respectively, in a steering wheel 13 which is positioned in front of the driver's seat 11 and in a dashboard 14 which is positioned in front of the passenger's seat 12. In addition, there are disposed a first and a second, i.e., a total of two impact sensors 21, 22 in a front portion 2 of the vehicle 1. The first impact sensor 21 is for detecting the magnitude of the impact force to act in the direction of x (longitudinal direction) which is the direction of travel of the vehicle 1. The second impact sensor 22 is for detecting the magnitude of the impact force in the direction of y (lateral direction) which is at right angles to the direction x. When the vehicle 1 is collided in the direction of F as shown in FIG. 1, the impact force F due to the collision occurs in the same linear direction as that of F to act on the driver. Then, the impact sensors 21, 22 detect the components of force Fx, Fy of the impact force F in the directions of x and y, respectively, and output the respectively detected components of force to an operational processing circuit 23. The operational processing circuit 23 calculates an angle $\theta$ of deviation of the impact force F towards the passenger's seat as well as the magnitude of the impact force F on the basis of the above-described components of force by using the following formulae.

$$\theta = \tan^{-1}\left(\frac{Fy}{Fx}\right)$$

$$F = \sqrt{Fx^2 + Fy^2}$$

Then, the angle θ of deviation and the magnitude of the impact force F calculated in the operational processing circuit 23 are output to a controller 3. To the controller 3 there is connected a boosting circuit 30 for boosting the voltage of electric power supply from a battery 31 via a key switch 32. To the output side of the booster circuit 30 there is connected a capacitor 4 which is charged by the boosted voltage. Since the capacitor 4 is also connected to the input side of the boosting circuit 30, the capacitor 4 is directly charged by the battery 31 when the boosting circuit 30 is not in operation, while it is charged by the boosted voltage when the boosting circuit 30 is in operation. This boosting circuit 30 is a conventional one. The output voltage of the boosting circuit 30 can be controlled by varying the duty factor of the ON-OFF cycle of a transistor 33 which is contained in the boosting circuit 30. The output voltage of the boosting circuit 30 is constantly monitored by the controller 3.

A small-sized capacitor 4 of large capacity is suitable. An electrolytic capacitor or an electrical double layer capacitor is used. To the capacitor 4 there is connected a series circuit comprising a power transistor 51 which operates as a switching element, an inflating means 61 which inflates the air bag contained in the steering wheel 13, and a switch-type acceleration sensor 52 which is switched on when the impact force to occur at the time of collision of the vehicle is above a predetermined value. To this series circuit there is further connected in parallel another series circuit comprising a power transistor 53, an inflating means 62 which inflates the air bag contained in the dashboard 14, and an acceleration sensor 54 which is similar to the above-described one. The lower potential sides of the inflating means 61, 62 are connected to each other. The bases of the above-described power transistors 51, 53 are connected to the controller 3. To the controller 3 there is connected a seat switch 7 which is switched on when a passenger is seated in the passenger's seat 12.

Next, the operation of the embodiment having the above-described constitution is explained.

When a passenger is not seated in the passenger's seat 12, the seat switch 7 is kept switched off and the controller 3 judges that there is no passenger in the passenger's seat 12. When the vehicle is collided in such a condition, the operational processing circuit 23 calculates the above-described angle θ of deviation and the magnitude of the impact force F based on the detected signals from the impact sensors 21, 22. The calculated result is output to the controller 3. The controller 3 first compares the magnitude of the impact force F with a predetermined force F1 and, if F is larger than F1, causes the power transistor 51 to be switched on to bring the inflating means 61 to a condition ready to be operated. Along with this operation the controller 3 compares a predetermined angle θ1 with the calculated angle θ of deviation and, if θ is smaller than θ1, for example, when the vehicle is collided at the front portion thereof, the power transistor 53 is kept switched off. Therefore, even if the acceleration sensors 52, 54 are switched on by the collision, only the inflating means 61 is operated and the inflating means 62 is not operated or prohibited from operating. It follows that only the air bag for the driver's seat which is contained in the steering wheel is inflated and the air bag for the passenger's seat which is contained in the dashboard 14 is not inflated.

Next, in case where the vehicle 1 is collided in a direction deviated towards the passenger's seat 12, the angle θ becomes equal to or larger than θ1. The controller 3 causes the power transistor 53 to be switched on and cancels the prohibition of operation of the inflating means 62. Therefore, the air bag contained in the dashboard 14 is brought to a condition in which it can be inflated. It follows that the air bag contained in the dashboard 14 can also be inflated when the impact force is large and the acceleration sensors 52, 54 are operated.

In the above-described embodiment, the angle θ of deviation of the impact force is obtained by using the impact sensors 21, 22 and, when the angle θ of deviation is equal to or larger than the predetermined angle θ1, the power transistor 53 is caused to be switched on. However, it may also be so arranged that an acceleration sensor which is similar to those of the above-described ones 52, 54 is so disposed as to be operated when an impact force in the y direction is exerted, thereby switching on the power transistor 53 through the operation of the acceleration sensor.

When there is seated a passenger in the passenger's seat, the seat switch 7 is switched on. Therefore, the controller 3 brings both power transistors 51, 53 to a switched-on condition as long as the condition that F is larger than F1 is satisfied, regardless of the angle θ of deviation. At the same time, the output voltage of the boosting circuit 30 is raised to a predetermined voltage to raise the charging voltage of the capacitor 4. Therefore, when the acceleration sensors 52, 54 are switched on, the inflating means 61, 62 are supplied by the capacitor 4 with an electric power sufficient to operate them, thereby assuring the inflation of the air bags without failure.

It is readily apparent that the above-described air bag apparatus has the advantages of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In an improved air bag apparatus for a vehicle having an air bag for a driver's seat and an air bag for a passenger's seat, respectively, each said air bag being disposed in front of the driver's seat and the passenger's seat, and being inflatable at the time of collision of the vehicle, and prohibiting means for prohibiting the inflation of said air bag for the passenger's seat when there is no passenger in the passenger's seat, the improvement comprising:

prohibition cancelling means which, upon detection of the direction of an impact force to act on a driver, cancels the operation of said prohibiting means when the direction of the impact force deviates from the front of the vehicle towards the passenger's seat beyond a predetermined angle.

2. An air bag apparatus according to claim 1, further comprising:

a first impact sensor for detecting the magnitude of an impact force in a longitudinal direction; and
a second impact sensor for detecting the magnitude of an impact force in a lateral direction, said first and second impact sensors being disposed on the vehicle, and
wherein said prohibiting means comprises:
operation means for calculating the direction of action of the impact force based on detected outputs of said impact sensors;
a switching element interposed in an operating circuit for said air bag for the passenger's seat; and
control means for causing said switching element to become conductive when the direction of action of the impact force deviates towards the passenger's seat beyond said predetermined angle.

3. An air bag apparatus for a vehicle having an air bag for a driver's seat and an air bag for a passenger's seat, respectively, each said air bag being disposed in front of the driver's seat and the passenger's seat, and being inflatable at the time of collision of the vehicle, and prohibiting means for prohibiting the inflation of said air bag for the passenger's seat when there is no passenger in the passenger's seat, said air bag apparatus comprising:
an acceleration sensor means which is operated when the impact force to act on a driver in the direction towards the passenger's seat at the time of collision of the vehicle exceeds a predetermined value; and
prohibition cancelling means which cancels the operation of said prohibiting means in response to the operation of said acceleration sensor means.

* * * * *